No. 690,171. Patented Dec. 31, 1901.
E. MILLS.
ANIMAL TRAP.
(Application filed July 2, 1901.)
(No Model.)
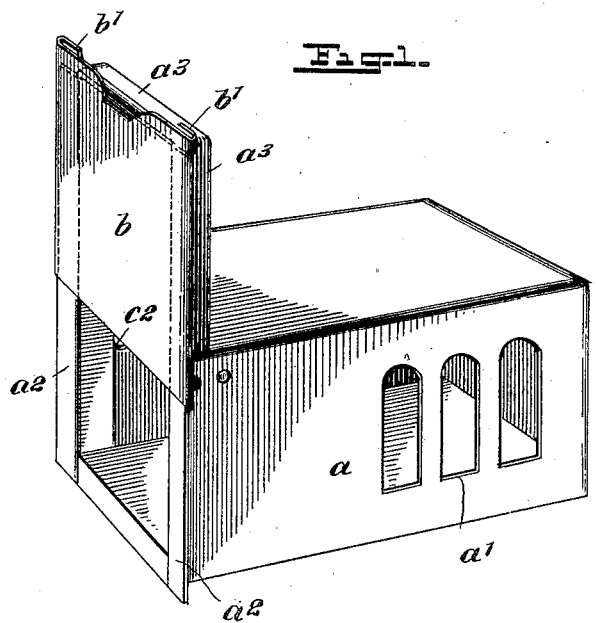
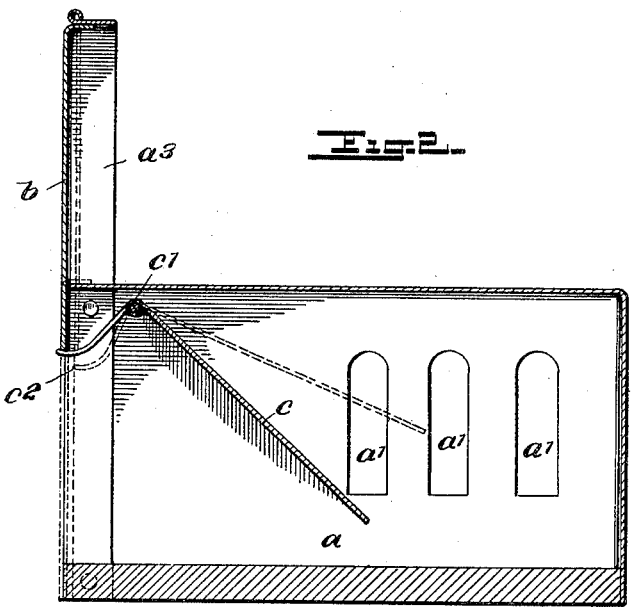
WITNESSES:
Geo. W. Naylor
J. B. Owens
INVENTOR
Edward Mills
BY Munn & Co.
ATTORNEYS

UNITED STATES PATENT OFFICE.

EDWARD MILLS, OF JACKSONVILLE, ILLINOIS.

ANIMAL-TRAP.

SPECIFICATION forming part of Letters Patent No. 690,171, dated December 31, 1901.

Application filed July 2, 1901. Serial No. 66,822. (No model.)

*To all whom it may concern:*

Be it known that I, EDWARD MILLS, a citizen of the United States, and a resident of Jacksonville, in the county of Morgan and State of Illinois, have invented a new and Improved Animal-Trap, of which the following is a full, clear, and exact description.

This invention relates to a trap adapted for catching animals of any sort, and it comprises a cage, a door tending to close, and a peculiarly-arranged trip device normally holding the door in open position and released by the victim to permit the closure of the door.

This specification is a specific description of one form of the invention, while the claim are definitions of the actual scope thereof.

Reference is to be had to the accompanying drawings, forming a part of this specification, in which similar characters of reference indicate corresponding parts in both views.

Figure 1 is a perspective view of the invention, and Fig. 2 is a longitudinal section thereof.

$a$ indicates the cage, which is preferably formed with openings $a'$ in its sides, these openings being insufficient for the passage of the animal, but of such form and arrangement that the bait may be easily seen from the outside. $b$ indicates the door of the trap, which, as here shown, tends to close by gravity, it being provided with inturned flanges $b'$, slidably fitted on guides $a^2$, formed on the cage $a$, at the open end thereof. The cage $a$ has a frame $a^3$ at said open end, the frame projecting upward and forming a continuation of the guides $a^2$. On this frame $a^3$ the door $b$ is sustained when in elevated position.

The trip device comprises a plate $c$, which has a width equal approximately to the interior width of the cage $a$. This plate is pivoted at its upper edge on a transverse bar $c'$ and has a lip $c^2$ projecting from the opposite side of the pivot and adapted to lie under the door $b$ to sustain the same when the parts are in the position shown in Fig. 2. The gravity of the plate $c$ holds the parts in the position shown by full lines in Fig. 2, and as an animal enters the trap the plate $c$ is raised in the effort to reach the inner part of the cage, where the bait should be placed. This throws down the lip $c^2$ and causes it to clear the door, whereupon the door falls by gravity and the animal is entrapped.

Having thus described my invention, I claim as new and desire to secure by Letters Patent—

An animal-trap, comprising a cage, a door mounted to move vertically on the cage to command the opening therein, and a trip-plate pivoted horizontally within the cage at the upper part thereof, so that the victim may pass under the trip-plate and raise it, the trip-plate having a lip projected forwardly from one side of the pivot, said lip being arranged to engage under the door to hold it removably in raised position, whereby as the trip-plate is raised the lip is disengaged from the door and the door allowed to close.

In testimony whereof I have signed my name to this specification in the presence of two subscribing witnesses.

EDWARD MILLS.

Witnesses:
EDWARD P. KIRBY,
CLARA LOIS PIERSON.